United States Patent
Schwonke et al.

(10) Patent No.: US 7,306,843 B2
(45) Date of Patent: Dec. 11, 2007

(54) LINOLEUM-BASED PLANAR STRUCTURE AND PROCESS FOR MAKING SAME

(75) Inventors: Karl-Heinz Schwonke, Lochgau (DE); Marco Dowidat-Eskes, Delmenhorst (DE); Ole Markmann, Delmenhorst (DE); Milko Ess, Freiberg/Neckar (DE)

(73) Assignee: DLW Aktiengesellschaft, Inc., Bietigheim-Bissingen (DE)

( * ) Notice: Subject to any disclaimer, the term of this patent is extended or adjusted under 35 U.S.C. 154(b) by 0 days.

(21) Appl. No.: 09/916,385

(22) Filed: Jul. 27, 2001

(65) Prior Publication Data

US 2002/0020128 A1    Feb. 21, 2002

(30) Foreign Application Priority Data

Jul. 27, 2000    (EP)    ................................. 00116317

(51) Int. Cl.
*B32B 5/16*    (2006.01)
*B32B 17/10*   (2006.01)
*B32B 27/00*   (2006.01)

(52) U.S. Cl. ...................... 428/327; 428/220; 428/332; 428/339; 428/500

(58) Field of Classification Search ................ 428/323, 428/327, 332, 339, 411.1, 500, 926
See application file for complete search history.

(56) References Cited

U.S. PATENT DOCUMENTS

| | | | | | |
|---|---|---|---|---|---|
| 2,321,996 | A | * | 6/1943 | Cohen et al. | 156/238 |
| 2,962,081 | A | * | 11/1960 | Dobry et al. | 154/20 |
| 3,325,337 | A | * | 6/1967 | Harris | 428/67 |

* cited by examiner

*Primary Examiner*—Sheeba Ahmed
(74) *Attorney, Agent, or Firm*—Womble Carlyle Sandridge & Rice, PLLC

(57) ABSTRACT

A linoleum-based planar structure, a process for the preparation of such a planar structure as well as the use of the planar structure, for example, as a floor covering is provided. The linoleum-based planar structure contains flakes, including organic polymeric material, over the whole cross section of the linoleum sheet. The flakes are compatible with the linoleum base composition and have a particle size in the range of 0.5 mm to 30 mm and a thickness in the range of 1.0 µm to 400 µm. Such a planar structure displays a smooth plain surface without the need of any grinding step. Moreover, the incorporation of such flakes enables a broad variety of designing and patterning, particularly the development of a distinctively, coarsely patterned "spotting structure."

32 Claims, 3 Drawing Sheets

LINOLEUM-BASED PLANAR STRUCTURE AND PROCESS FOR MAKING SAME

REFERENCE TO RELATED APPLICATION

Figure 1:
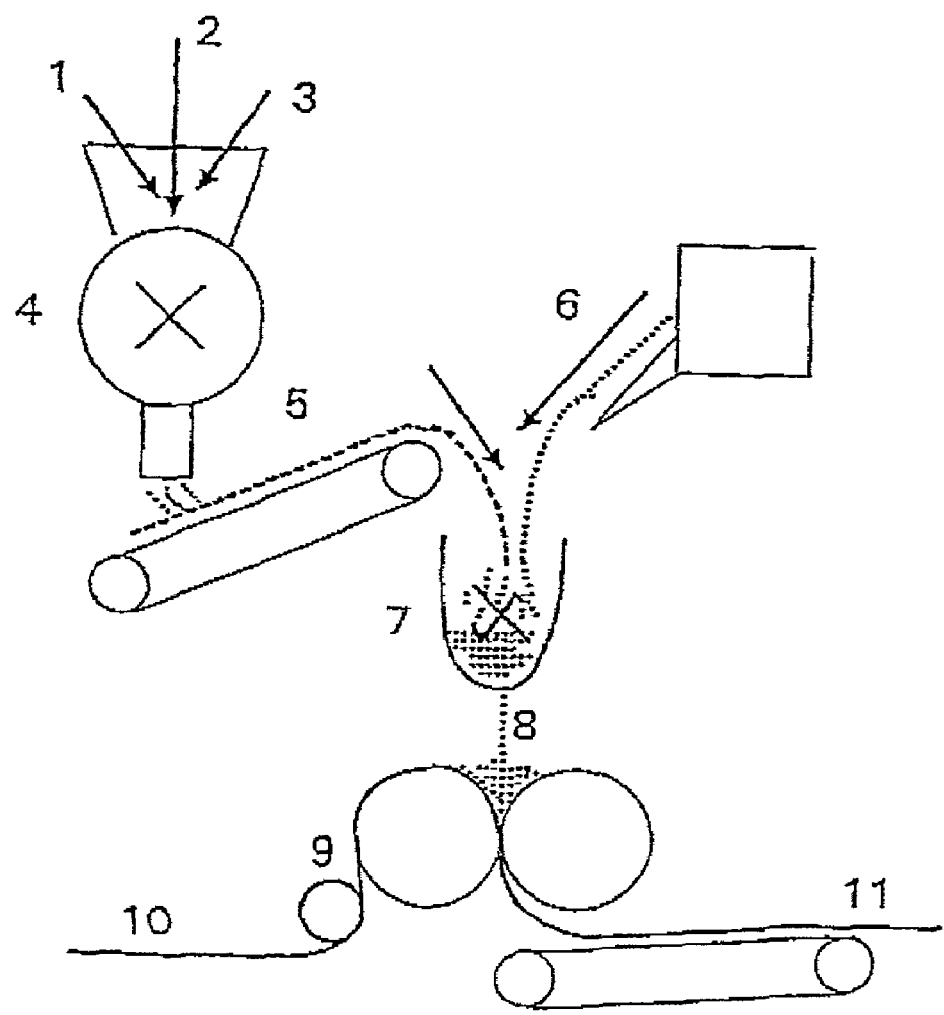

This application claims the benefit, pursuant to 35 U.S.C. §119, of the filing date of European Application No. 00 116 317.9-2113, filed Jul. 27, 2000.

DESCRIPTION

The present invention relates to a linoleum-based planar structure a process for the preparation of such a planar structure as well as the use of the planar structure, for example, as a floor covering. The linoleum-based planar structure according to the present invention is particularly characterized by containing over the whole cross section flakes comprising an organic polymeric material, the flakes being compatible with the linoleum base composition and having a particle size in the range of 0.5 to 30 mm and a thickness in the range of 1.0 to 400 µm. Such a planar structure according to the present invention displays a smooth plain surface without the need of any grinding step. Moreover, the incorporation of such flakes enables a broad variety of designing and patterning, particularly the development of a distinctively, coarsely patterned "spotting structure".

Planar structures like floor coverings based on linoleum comprise a Bedford cement (abbreviated to "B cement") made from a partially oxidized linseed oil, at least one resin as tackifier and at least one filler, such as softwood flour and/or ground cork (if wood flour and ground cork are both present, the weight ratio is typically 90:10) and/or chalk, kaolin (China clay) and barites, and at least one pigment, such as titanium dioxide and other conventional colorants based on inorganic and organic dyes. A typical linoleum base composition consists of, based on the weight of the wear layer, about 40% by weight of binder, about 30% by weight of organic fillers, about 20% by weight of inorganic (mineral) fillers and about 10% by weight of colorants.

Continuous webs of conventional linoleum floor coverings are produced by firstly mixing all of the components, such as binder (B cement), fillers, pigments and conventional additives, such as processing aids, antioxidants, UV stabilizers, lubricants and the like in a suitable mixing apparatus, e.g. a compounder, roller assembly or extruder, to give a linoleum base composition which is as homogeneous as possible. To produce a single-color linoleum covering, the linoleum composition is fed to a roller assembly (calender) and pressed at a temperature of usually from 10 to 150° C. (depending on the formulation and the processing technique) onto a carrier, mostly a jute fabric or a glass-fiber fabric optionally coated with a coupling agent. The calender nip is set so that the resultant floor covering web is given the desired thickness.

The process may be varied by, in the first step on the roller assembly, pressing a single-color linoleum composition onto the carrier fabric in only a sufficient amount to fill the interstices present in the fabric and give a continuous level surface. The carrier fabric coated in this way is then pressed in a suitable manner together with a linoleum sheet (i.e. a calendered web made from a linoleum base composition without a carrier fabric and produced using a different pair of rolls on the calender) to give the final floor covering. To improve the thermal insulation properties and the sound insulation, a corkment layer may be introduced between the (uncoated or coated) carrier and the linoleum sheet. Corkment is a mixture comprising B cement and ground cork as filler.

If a floor covering with a colored pattern is to be produced, linoleum compositions of varying color are produced and granulated. Differently colored granules are then fed to e.g. a double belt auma, and pressed either directly onto the carrier fabric or onto the carrier fabric which has been precoated with a single-color base compound and/or a corkment layer, giving, for example, a floor covering with a marble-type patterning.

Besides such a marble-type patterning as mentioned above, with the common processing methods, a pattern that is distorted longitudinally in the conveying direction is produced on account of the conveyance of the pellet material in the calendering direction and simultaneous heating and pressing. Under specific processing conditions, however, there can also be achieved nondirectional color structures in multicolored structures.

To the contrary, a spotted patterned structure is rarely known in the field of linoleum based planar structures. DE 44 07 989 describes a linoleum based planar structure, wherein organic and mineral particles are fed to the linoleum composition to obtain such a spotted patterned structure. For the preparation thereof, the linoleum composition mixed with the organic/mineral particles is directly processed to produce single-layer floor coverings. However, the process of the linoleum based planar structure as described in DE 44 07 989 is disadvantageous in that the spots of which the respective spotted patterned structure is composed, are very small, at most 0.5 to 1 mm, giving rise to a relatively dull aesthetic. Moreover, the greater the particles, the rougher the surface of the floor covering thus obtained. Due to the relatively rough surface of those coverings caused by the protrusion of the organic/mineral particles, a grinding step is always needed to get a more smooth plain surface. Furthermore, the possibilities of varying the patterns or designs of the products obtainable by the process described in DE 44 07 989 are fairly limited. Moreover, DE 44 07 989 does not involve the preparation of two-layer or multi-layer coverings by e.g. rolling out the linoleum composition mixed with the organic/mineral particles to a backing-free linoleum strip (being referred to as a linoleum sheet) which is cut into chips or pellets, respectively, which can then be calendered to two-layer or multi-layer coverings.

Therefore, it is an object of the present invention to provide a linoleum based planar structure that has a more distinctively and more coarsely patterned "spotting structure" and displays a smooth plain surface without the need of any grinding step. Moreover, it is an object of the present invention to provide a process for the preparation of such a planar structure which enables a broad variety of designing and patterning and can be easily carried out in an economically advantageous manner.

This object is solved by the embodiments characterized in the claims. In particular, there is provided a linoleum-based planar structure that is characterized by containing over the whole cross section flakes comprising an organic polymeric material, the flakes being compatible with the linoleum base composition and having a particle size in the range of 0.5 to 30 mm, preferably in the range of 0.5 to 10 mm, more preferably in the range of 1.5 to 10 mm, and a thickness in the range of 1.0 to 400 µm, preferably in the range of 1.0 to 100 µm, more preferably 1.5 to 50 µm.

In the preparation of the planar structure according to the present invention, due to their particular shape, i.e. the specifically dimensioned particle structure, the flakes have the advantage to essentially orientate flat to the linoleum surface within the calender nip. Owing to the rather two-dimensional flat-shaped particle structure of the flakes, this alignment takes place over the whole cross section of the final planar structure, i.e. on the upper side as well as the lower side, so that the flakes are uniformly distributed over the entire structure. This specific structure thus obtained guarantees a completely patterned planar structure that maintains the specific patterned structure even at stronger abrasion.

Moreover, such a planar structure according to the present invention displays a smooth plain surface without the need of any grinding step. Further, the incorporation of such flakes enables a broad variety of designing and patterning, particularly the development of a more distinctively and more coarsely patterned "spotting structure", when compared to the structure of DE 44 07 989.

The flakes are required to be compatible with the linoleum base composition. Besides the organic polymeric material, the flakes can further contain conventional fillers, pigments and processing aids. In a preferred embodiment, the organic polymeric material of which the flakes are comprised, is selected from the group consisting of a material containing the reaction product of at least one dicarboxylic acid or one polycarboxylic acid or derivatives thereof or a mixture thereof with at least one epoxidation product of a carboxylic acid ester or a mixture of said epoxidation products, poly (meth)acrylates, polyvinylacetates, and a mixture thereof. The flakes mainly comprised of those organic polymeric materials can be produced by the conventional methods used in the common flake technology as known to a person skilled in the art. The specific dimensions of the flakes can be attained by using a respective screening assembly.

With respect to the above material containing the specific reaction product, maleic acid, itaconic acid, fumaric acid, succinic acid, methylsuccinic acid, malic acid, furandicarboxylic acid, phthalic acid, tartaric acid, or citraconic acid, or a mixture thereof containing at least two of these acids can preferably be used as dicarboxylic acid. Acids with three or more carboxyl groups such as, for example, citric acid, aconitic acid and trimellitic acid can preferably be used as polycarboxylic acids.

Anhydrides or partial esters or derivatives having at least one free carboxyl group can be used as derivatives of the dicarboxylic acids or polycarboxylic acids. The alcohol component of the partial esters is not subject to special restriction, but polyols such as dipropylene glycol, propanediols, butanediols, hexanediols, hexanetriols, pentaerythritol or glycerin are preferably used as alcohol component In an especially preferred embodiment, a mixture of a partial ester of maleic anhydride and dipropylene glycol together with citric acid is used as crosslinking agent within the above mentioned specific material. For example, the content of citric acid is up to 50 percent by weight, more preferably up to 25 percent by weight, relative to the total amount of crosslinking agent The epoxidation product of a carboxylic acid ester of which the above material is further comprised, preferably contains more than one epoxy group per molecule.

Epoxidized linseed oil, epoxidized soybean oil, epoxidized castor oil, epoxidized rape-seed oil or vernonia oil or a mixture thereof containing at least two of these epoxidized products can preferably be used as epoxidation product of a carboxylic acid ester. Most of the afore-defined alcohols of the partial esters, such as, for example, dipropylene glycol, propanediols, butanediols, hexanediols, hexanetriols, or pentaerythritol can also be used as alcohol component of these carboxylic acid esters. The carboxylic acid component is not subject to special restriction.

In the reaction product of which the above flake material can be comprised, the quantities by weight of crosslinking agent and epoxidation product are each preferably 5 to 85 percent by weight, relative to the total quantity of the material mass. Moreover, if the flakes are mainly comprised of such a reaction product, a covalent linkage of the flakes to the linoleum can be achieved by wetting of the flakes with a free radical forming agent such as, for example, conventional peroxides like DHBP (2,5-dimethyl-2,5di(tert-butylperoxy)hexane) as well as optionally additives that promote the curing reaction like triallylcyanurate or vinyltrimethoxysilane. Then, in the subsequent processing steps during the preparation of the planar structure according to the present invention, for example by the combined action of external heating and internal friction, covalent bondings between the flake material and the linoleum cement can be effected via remaining double bonds of the linoleum cement or via hydrogen abstraction of —$CH_2$— groups and subsequent recombination of radicals.

Preferably, the flakes employed in the planar structure of the present invention are present in an amount ranging from 1 to 15 wt.-%, more preferably 1 to 10 wt.-%, based on the total amount of linoleum base composition. Further, the planar structure according to the present invention has preferably a thickness in the range of 0.8 to 4.0 mm.

The flakes can be single-colored or multi-colored. For particular aesthetic purposes, the flakes can be provided with a colorant selected from the group consisting of optical brightening agents, fluorescent agents and phosphorescent agents or a mixture thereof. For example, 4,4'-*diamino-2, 2'-stilbenedisulfonic acid derivatives, 4,4'-distyryl-biphenylene derivatives, cumarine derivatives, dihydroquinolinone derivatives, 1,3-diarylpyrazoline derivatives, acridines and xanthenes like fluorescin and rhodamine, benzoxazole-, benzisoxazol- and benzimidazole systems linked via CH=CH bondings and pyrene derivatives substituted by heterocycles can suitably used as optical brightening agents and fluorescent agents, respectively. The phosphorescent agents are not subject to specific restrictions and, for example, can be the latter compounds substituted by heavy atoms like Br and/or I. The coloring of the flakes with such colorants enhances the variety to pattern the planar structure according to the present invention.

Additionally, there is provided a process for producing such a linoleum-based planar structure, comprising the steps of.

(a) preparing a linoleum base composition,
(b) adding flakes comprising an organic polymeric material, the flakes being compatible with the linoleum base composition and having a particle size in the range of 0.5 to 30 mm and a thickness in the range of 1.0 to 400 μm to the linoleum base composition, and
(c) rolling out the linoleum composition obtained in step (b) by means of a roller assembly into a linoleum sheet.

With the process according to the present invention, a linoleum-based planar structure that displays a smooth plain surface and has a unique "spotting structure", can be produced in the way described above without the need of any grinding step due to the specifically flat shaped flakes used. Consequently, planar structures like floor coverings having a unique "spotting structure", i.e. a more distinctively and more coarsely patterned "spotting structure" when compared to the structure of DE 44 07989, which have so far not been attainable, can be produced in a simple manner.

FIG. 1 shows a schematic view of one embodiment of said process for producing such a linoleum-based planar structure according to the present invention, wherein the planar structure is obtained in the form of a single-layer linoleum floor covering.

Figure 2:
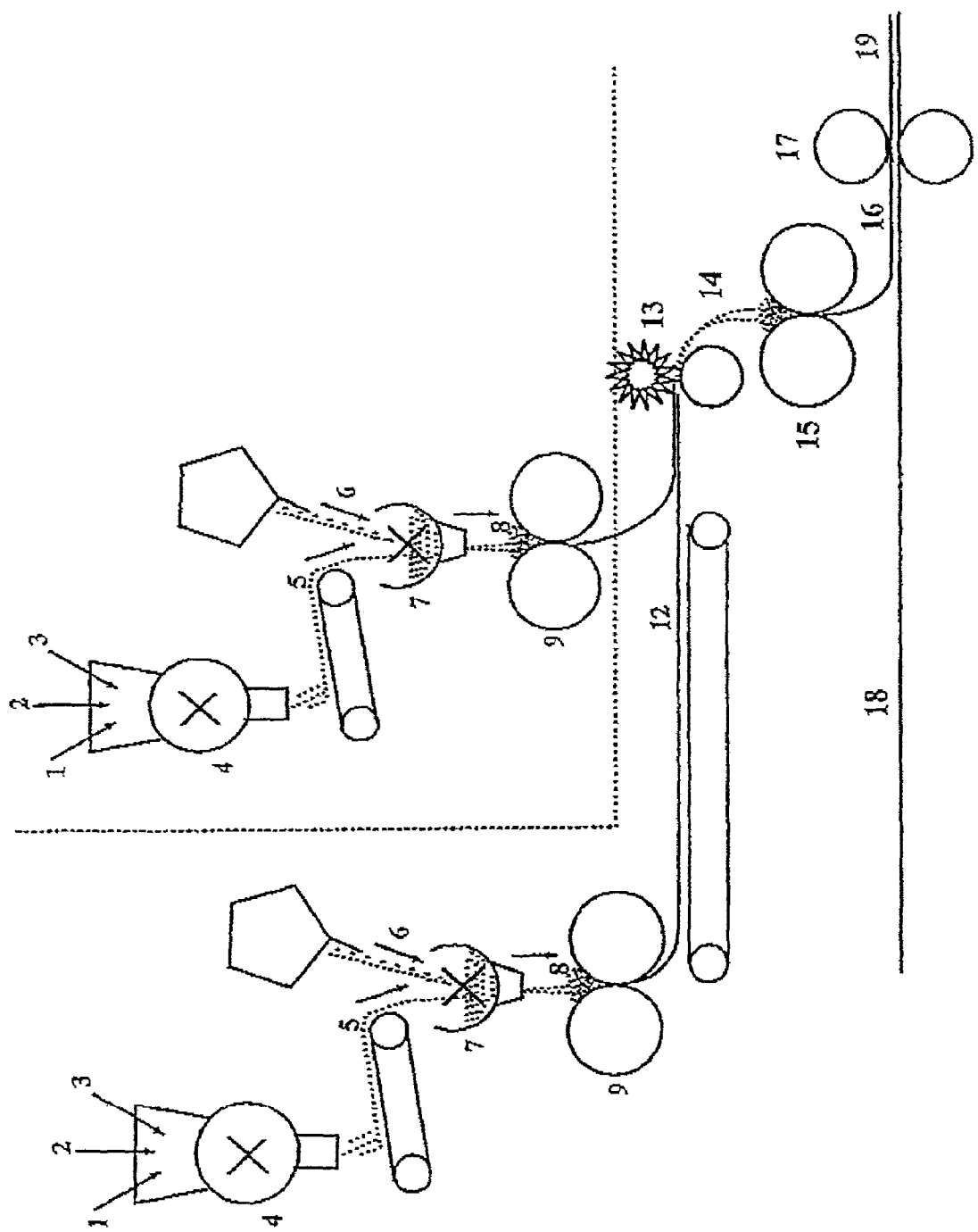
Figure 3:
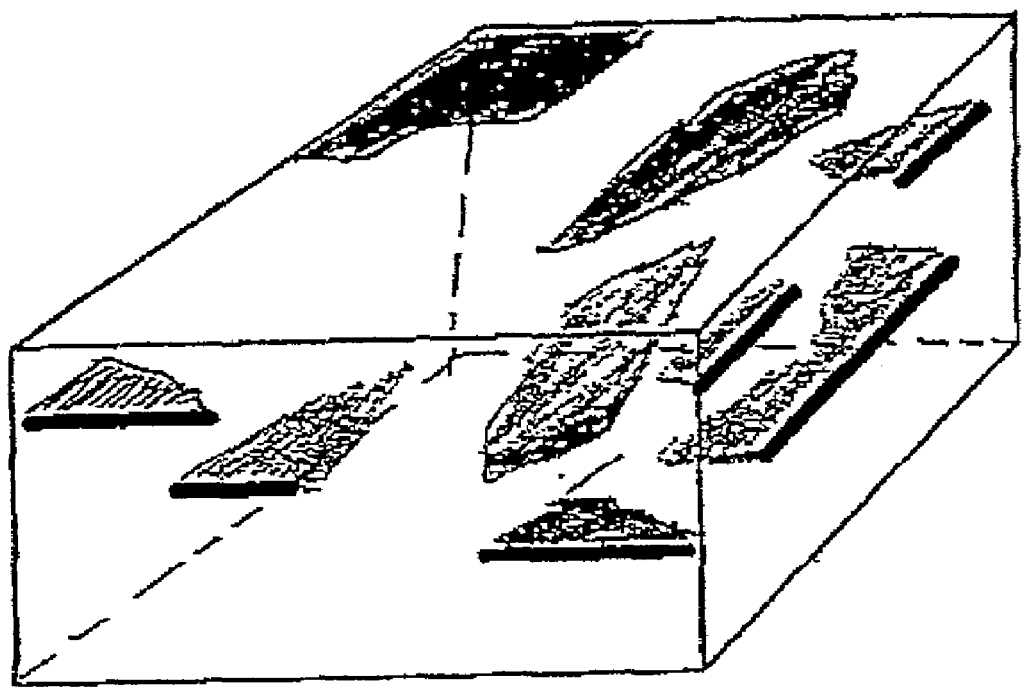

FIG. 2 shows a schematic view of other embodiments of said process for producing such a linoleum-based planar structure according to the present invention, wherein the planar structure is obtained in the form of a double-layer linoleum floor covering, FIG. 3 shows a model of a chip (pellet) with specifically dimensioned flakes distributed therein, the chip being obtained in course of the second embodiment of the process for producing such a linoleum-based planar structure according to the present invention.

Preferably, step (c) of the above process concurrently includes the steps of providing a carrier in web form and coating one side of the carrier with at least one upper layer of the linoleum composition obtained in step (b) (see also FIG. 1). The carrier may be any material which has been used in floor coverings so far and which is based on natural and/or synthetic woven or knitted fabrics or on textile materials. Examples are jute fabrics, fabrics made from a mixture of natural fibers, such as cotton and staple viscose, glass-fiber fabrics, glass-fiber fabrics coated with a coupling agent, fabrics made from a mixture of synthetic fibers and fabrics made from core/sheath fibers with, for example, a core of polyester and a sheath of polyamide. Preferred examples are a jute fabric, a glass fiber web or a polyester web. As coupling agent for the afore-mentioned fabrics, a coating of a styrene-butadiene latex may be used.

FIG. 1 schematically shows one embodiment of the process for producing such a linoleum-based planar structure according to the present invention, wherein the planar structure is obtained in the form of a single-layer linoleum floor covering. Such a single-layer linoleum floor covering can be produced by firstly mixing all of the components, such as binder (B cement), fillers, pigments and conventional additives, such as processing aids, antioxidants, UV stabilizers, lubricants and the like in a suitable mixing apparatus, e.g. compounders, internal mixers, twin screw extruders, planetary gear extruders or roll mills, to give a linoleum base composition which is as homogeneous as possible. Then, the linoleum base composition and the specifically dimensioned flakes are mixed together in the cold state in a whirling mixer and subsequently plasticated in an internal mixer. The composition is passed on to a roller assembly like a calender and pressed at a temperature of usually from 10 to 150° C. (depending on the formulation and the processing technique) onto a carrier to obtain a single-layered homogeneous linoleum floor covering.

In another embodiment, the process according to the present invention further comprises the steps of:
(d) cutting the linoleum sheet obtained in step (c) into chips by means of rotating cutters,
(e) rolling out the thus obtained chips by means of a roller assembly into a linoleum sheet, and
(f) optionally applying the linoleum sheet obtained in step (e) as a wear layer onto a single layer linoleum web to obtain a multi-layered linoleum floor covering.

FIG. 2 schematically shows such a process, wherein the planar structure is obtained in the form of a double-layer linoleum floor covering. After mixing the linoleum base composition together with the specifically dimensioned flakes in the cold state in a whirling mixer and subsequently plasticating in an internal mixer, the resulting mass is passed on to a roller assembly and a strip of sheeted out linoleum web, i.e. a calendered web without a carrier fabric and produced using a different pair of rolls on the calender, is drawn off and subsequently fed to a hot cut pelletizer or granulator, respectively, so that the linoleum sheet firstly obtained is cut up by means of rotating cutters to thereby obtain chips (pellets). These chips (pellets) can be further processed by e.g. calenders, roller assembly, double belt auma, press rolls, etc., to obtain linoleum-based coverings as it is known to a person skilled in the art. To vary the possibilities of designing and patterning of the covering, an already calendered linoleum web of different designing and patterning can concurrently be fed into the granulator (cf. FIG. 2). Alternatively, chips of different colors, i.e. chips obtained by cutting up other linoleum sheets, can directly be metered in shortly before the further processing. Moreover, at this stage, also further flakes as described above can additionally be metered in. For example, the chips (pellets) can be taken for the preparation of a wear layer of a multi-layer linoleum covering by pressing the chips into a sheet by means of e.g. a calender, and then pressing the thus obtained sheet onto a single-layer linoleum covering by e.g. a double belt auma to obtain a multi-layer covering.

To improve the thermal insulation properties and the sound insulation, a corkment layer can be introduced between the (uncoated or coated) carrier or the single-layer linoleum sheet and the above wear layer.

Since the linoleum based floor covering sheets thus obtained still do not have adequate tensile strength and compressive strength, they are conventionally dried in a subsequent maturing process in maturing chambers at a temperature of about 40° C. to 100° C., for a period of a few days up to several weeks. This causes the binder further to cross-link and gives the material the desired tensile and compressive strength.

LIST OF REFERENCE NUMERALS 1 linoleum cement
2 wood flour, ground cork, chalk
3 colorants (pigments)
4 compounder
5 linoleum base composition
6 flakes
7 mixer
8 linoleum composition containing the flakes
9 roller assembly or calender
10 carrier web, e.g. a jute fabric
11 single-layered linoleum covering, unmatured
12 linoleum sheet, i.e. a calendered web without a carrier fabric
13 rotating cutters (granulator)
14 granulate (chips, pellets)
15 roller assembly or calender
16 linoleum wear layer
17 band calender
18 support layer, carrier, etc.
19 final linoleum sheet, unmatured

The invention claimed is:

1. A planar structure comprising:
a linoleum sheet formed of a linoleum base composition, the linoleum sheet containing over the entire thickness thereof flakes comprising an organic polymeric material, the flakes being compatible with the linoleum base composition, wherein each of the flakes has a thickness in the range of 1.0 μm to 400 μm and wherein the linoleum sheet includes from about 1% to about 15% by weight of the flakes.

2. The planar structure according to claim 1, wherein the organic polymeric material comprises at least one polymer selected from a poly(meth)acrylate, a polyvinylacetate, a product of a reaction between a carboxylic acid and an epoxidation product of a carboxylic acid ester, or mixtures thereof.

3. The planar structure according to claim 1, wherein the organic polymeric material is selected from a material containing: 1) the reaction product of a) at least one dicarboxylic acid or one polycarboxylic acid or derivatives thereof or a mixture thereof with b) at least one epoxidation product of a carboxylic acid ester or a mixture of the epoxidation products; 2) poly(meth)acrylates; 3) polyvinylacetates; or 4) a mixture thereof.

4. The planar structure according to claim 3, wherein the at least one dicarboxylic acid is maleic acid, itaconic acid, fumaric acid, succinic acid, methylsuccinic acid, malic acid, furandicarboxylic acid, phthalic acid, tartaric acid, or citraconic acid, or a mixture thereof containing at least two of these acids.

5. The planar structure according to claim 3, wherein the polycarboxylic acid is selected from citric acid, aconitic acid or trimellitic acid.

6. The planar structure according to claim 3, wherein the derivative of the di- or polycarboxylic acid is an anhydride or a partial ester.

7. The planar structure according to claim 6, wherein the alcohol component of the partial ester is a polyol.

8. The planar structure according to claim 3, wherein the mixture of at least one di- or polycarboxylic acid or derivatives thereof is a mixture of a partial ester of maleic acid anhydride and dipropylene glycol with citric acid.

9. The planar structure according to claim 3, wherein the at least one epoxidation product of a carboxylic acid ester is epoxidized linseed oil, epoxidized soybean oil, epoxidized castor oil, epoxidized rape-seed oil or vernonia oil, or a mixture thereof containing at least two of these epoxidized products.

10. The planar structure according to claim 1, wherein the thickness of the flakes is within the range of 1.0 µm to about 100 µm.

11. The planar structure of claim 10, wherein the linoleum sheet includes from about 1% to about 10% by weight of the flakes.

12. The planar structure according to claim 10, wherein the flakes are provided with an optical brightening agent, a fluorescent agent or a phosphorescent agent or a mixture thereof.

13. The planar structure of claim 2, wherein the carboxylic acid is at least one dicarboxylic acid.

14. The planar structure of claim 13, wherein the at least one dicarboxylic acid is selected from maleic acid, itaconic acid, fumaric acid, succinic acid, methylsuccinic acid, malic acid, furandicarboxylic acid, phthalic acid, tartaric acid, citraconic acid, or mixtures thereof.

15. The planar structure of claim 2, wherein the carboxylic acid is polycarboxylic acid.

16. The planar structure of claim 15, wherein the polycarboxylic acid is selected from citric acid, aconitic acid, trimellitic acid, or mixtures thereof.

17. The planar structure of claim 2, wherein the carboxylic acid is a carboxylic acid derivative from an anhydride, a partial ester, or mixtures thereof.

18. The planar structure of claim 17, wherein the alcohol component of the partial ester is a polyol.

19. The planar structure of claim 18, wherein the polyol is selected from dipropylene glycols, propanediols, butanediols, hexanediols, hexanetriols, pentaerythritols, glycerins, or mixtures thereof.

20. The planar structure of claim 2, wherein the organic polymeric material comprises a mixture of citric acid with a partial ester of maleic anhydride and dipropylene glycol.

21. The planar structure of claim 20, wherein the mixture comprises up to about 50% by weight citric acid.

22. The planar structure of claim 20, wherein the mixture comprises up to about 25% by weight citric acid.

23. The planar structure of claim 2, wherein the epoxidation product of a carboxylic acid ester is selected from epoxidized linseed oil, epoxidized soybean oil, epoxidized castor oil, epoxidized rape-seed oil, epoxidized veronia oil, or mixtures thereof.

24. A planar structure comprising:
a linoleum sheet formed of a linoleum base composition, the linoleum sheet containing over the entire thickness thereof flakes comprising an organic polymeric material, the flakes being compatible with the linoleum base composition and having a thickness in the range of 1.0 µm to 100 µm, wherein the organic polymeric material comprises the reaction product of: a) a mixture of a partial ester of maleic acid anhydride and dipropylene glycol with citric acid; with b) at least one epoxidation product of a carboxylic acid ester or a mixture of the epoxidation products.

25. The planar structure according to claims 1 or 24 wherein the thickness of the flakes is within the range of 1.5 µm to 50 µm.

26. The planar structure according to claims 1 or 24, wherein the flakes are present in an amount ranging from 1 to 10 wt-%, based on the total amount of linoleum base composition.

27. The planar structure according to claim 26, wherein the linoleum sheet has a thickness in the range of 0.8 mm to 4.0 mm.

28. The planar structure of claims 1 or 24, wherein each of the flakes has a thickness between about 1.5 µm and about 50 µm.

29. The planar structure of claim 24, wherein the linoleum sheet includes from about 1% to about 15% by weight of the flakes.

30. The planar structure of claims 1 or 24, wherein the flakes are single-colored.

31. The planar structure of claims 1 or 24, wherein the flakes are multi-colored.

32. The planar structure of claims 1 or 24, wherein the flakes include at least one agent selected from an optical brightening agent, a fluorescent agent, a phosphorescent agent, or mixtures thereof.

* * * * *